United States Patent
Mohol et al.

(10) Patent No.: US 11,522,427 B2
(45) Date of Patent: Dec. 6, 2022

(54) SINGLE PHASE INDUCTION MOTORS INCLUDING ALUMINUM WINDINGS AND HIGH PERMEABILITY LOW CORELOSS STEEL

(71) Applicant: EMERSON ELECTRIC CO., St. Louis, MO (US)

(72) Inventors: Amar Balasaheb Mohol, Kothrud Pune (IN); Vaibhav Audhut Kadam, Thergaon Pune (IN)

(73) Assignee: Emerson Electric Co., St. Louis, MO (US)

( * ) Notice: Subject to any disclaimer, the term of this patent is extended or adjusted under 35 U.S.C. 154(b) by 284 days.

(21) Appl. No.: 17/006,118

(22) Filed: Aug. 28, 2020

(65) Prior Publication Data

US 2022/0069686 A1    Mar. 3, 2022

(51) Int. Cl.
| | |
|---|---|
| *H02K 17/04* | (2006.01) |
| *F25B 31/02* | (2006.01) |
| *H02K 3/02* | (2006.01) |
| *H02K 1/16* | (2006.01) |

(52) U.S. Cl.
CPC ........... *H02K 17/04* (2013.01); *F25B 31/02* (2013.01); *H02K 1/16* (2013.01); *H02K 3/02* (2013.01)

(58) Field of Classification Search
CPC .. H02K 1/00; H02K 1/02; H02K 1/16; H02K 1/165; H02K 17/04; H02K 3/02; F25B 31/02
USPC .................. 310/166, 169, 171, 208
See application file for complete search history.

(56) References Cited

U.S. PATENT DOCUMENTS

| | | |
|---|---|---|
| 2,845,553 A | 7/1958 | Fargo et al. |
| 3,421,034 A | 1/1969 | Hershberger |
| 3,515,919 A | 6/1970 | Houtman |
| 3,942,055 A | 3/1976 | Hoffmeyer |
| 4,702,681 A | 10/1987 | Inaba et al. |
| 5,894,182 A | 4/1999 | Saban et al. |
| 6,554,009 B1 | 4/2003 | Beijbom et al. |

(Continued)

FOREIGN PATENT DOCUMENTS

WO    WO-2011028353 A2    3/2011

OTHER PUBLICATIONS

Study of Single Phase Induction Motor With Aluminum Versus Copper Stator Winding; Mariana Iorgulescu; 2016; University of Pitesti, Electrical Engineering Department.

*Primary Examiner* — Rashad H Johnson
(74) *Attorney, Agent, or Firm* — Harness, Dickey & Pierce, P.L.C.

(57) ABSTRACT

A single phase induction motor includes a stator core having a stator yoke and a plurality of teeth extending toward a central opening. The plurality of teeth are spaced apart from one another and define multiple slots between the teeth for receiving windings of the single phase induction motor. The stator core includes a high permeability low coreloss (HPLC) steel having a relative permeability of greater than or equal to 3000 at 1.5 Tesla and 60 Hertz, and a coreloss of less than or equal to 1.75 watts/lb at 1.5 Tesla and 60 Hertz. The motor also includes multiple windings located within the plurality of slots and wrapped around the plurality of teeth of the stator core. Each of the multiple windings include aluminum wire. The motor further includes a rotor body located concentrically within the stator core and including an external surface that faces the stator core.

23 Claims, 7 Drawing Sheets

(56) References Cited

U.S. PATENT DOCUMENTS

| | | |
|---|---|---|
| 6,984,909 B2 | 1/2006 | Kadoya et al. |
| 7,281,910 B2 | 10/2007 | Hasegawa |
| 7,868,509 B2 | 1/2011 | Yoshino et al. |
| 8,222,788 B2 | 7/2012 | Rose |
| 8,274,190 B2 | 9/2012 | Alexander et al. |
| 8,390,167 B2 | 3/2013 | Jung et al. |
| 8,441,165 B2 | 5/2013 | Jung et al. |
| 8,450,901 B2 | 5/2013 | Jung et al. |
| 9,214,839 B2 | 12/2015 | Fargo et al. |
| 9,407,194 B2 | 8/2016 | Johnson et al. |
| 9,831,727 B2 | 11/2017 | Brahmavar |
| 10,389,215 B2 | 8/2019 | Yabe et al. |
| 10,608,488 B2 | 3/2020 | Brahmavar et al. |
| 2004/0004408 A1* | 1/2004 | Yamazaki ............ H02K 3/12 310/184 |
| 2011/0033326 A1 | 2/2011 | Cao et al. |
| 2011/0050024 A1* | 3/2011 | Rose ............. F04C 23/008 310/195 |
| 2012/0082573 A1 | 4/2012 | Fargo et al. |
| 2012/0159983 A1* | 6/2012 | Tsutsumi ........... F25B 31/026 310/211 |
| 2012/0161568 A1* | 6/2012 | Umemoto ............ H02K 3/47 310/198 |
| 2014/0154115 A1* | 6/2014 | Bingaman ............ H02K 3/02 417/410.5 |
| 2015/0010412 A1* | 1/2015 | Liu .................. H02K 3/28 310/198 |
| 2015/0010414 A1* | 1/2015 | Tang ................. H02K 3/12 417/410.5 |
| 2015/0326082 A1 | 11/2015 | Kalluf et al. |
| 2016/0241092 A1* | 8/2016 | Nigo ............... F04C 18/344 |
| 2016/0301270 A1* | 10/2016 | Ota .................. H02K 1/08 |
| 2016/0365756 A1* | 12/2016 | Li ................... H02K 15/02 |
| 2016/0365781 A1* | 12/2016 | Li .................. H02K 1/2753 |
| 2017/0054353 A1* | 2/2017 | Li ................... H02K 1/148 |
| 2017/0194845 A1* | 7/2017 | Tang .............. F04C 18/0215 |
| 2017/0222528 A1* | 8/2017 | Tsuchida .......... H02K 1/2766 |
| 2018/0041076 A1* | 2/2018 | Matsuoka ........... H02K 1/146 |
| 2018/0041077 A1* | 2/2018 | Matsuoka ........... H02K 1/278 |
| 2018/0109153 A1* | 4/2018 | Matsuoka ......... H02K 1/2766 |
| 2018/0212482 A1* | 7/2018 | Nigo ................. H02K 1/18 |
| 2018/0212501 A1 | 7/2018 | Mayor et al. |
| 2019/0214863 A1* | 7/2019 | Hoemann ........... H02K 21/16 |
| 2019/0288571 A1* | 9/2019 | Lehikoinen .......... B64D 27/24 |
| 2020/0204029 A1* | 6/2020 | Ishikawa ............. H02K 7/14 |
| 2021/0104930 A1* | 4/2021 | Qiu ................. H02K 1/265 |
| 2021/0143690 A1* | 5/2021 | Qiao ................. H02K 3/28 |
| 2021/0152039 A1* | 5/2021 | Ishikawa ........... H02K 21/14 |
| 2021/0384786 A1* | 12/2021 | Tamura ............. H02K 11/33 |
| 2021/0408855 A1* | 12/2021 | Islam ............. H02K 1/2766 |
| 2022/0021250 A1* | 1/2022 | Lin .................. H02K 37/14 |
| 2022/0069686 A1* | 3/2022 | Mohol ............. F25B 31/02 |
| 2022/0094243 A1* | 3/2022 | Kislev .............. H02K 1/14 |
| 2022/0181959 A1* | 6/2022 | Takahashi .......... H02K 5/1735 |

\* cited by examiner

| Tesla | Standard Steel | | Low Loss Steel | | High Perm Low Coreloss Steel | |
|---|---|---|---|---|---|---|
| | Coreloss | Perm | Coreloss | Perm | Coreloss | Perm |
| 0.05 | 0.006 | 2137 | 0.002 | 2504 | 0.002 | 2585 |
| 0.1 | 0.019 | 3103 | 0.011 | 3444 | 0.009 | 3459 |
| 0.15 | 0.039 | 3806 | 0.026 | 4299 | 0.021 | 4283 |
| 0.2 | 0.063 | 4403 | 0.043 | 5020 | 0.038 | 5055 |
| 0.25 | 0.092 | 4911 | 0.067 | 5657 | 0.058 | 5717 |
| 0.3 | 0.126 | 5345 | 0.095 | 6208 | 0.082 | 6387 |
| 0.35 | 0.163 | 5744 | 0.125 | 6746 | 0.107 | 6984 |
| 0.4 | 0.204 | 6086 | 0.158 | 7251 | 0.135 | 7525 |
| 0.45 | 0.249 | 6375 | 0.192 | 7691 | 0.167 | 8028 |
| 0.5 | 0.298 | 6659 | 0.232 | 8053 | 0.2 | 8467 |
| 0.55 | 0.351 | 6909 | 0.274 | 8446 | 0.236 | 8884 |
| 0.6 | 0.409 | 7097 | 0.32 | 8797 | 0.273 | 9235 |
| 0.65 | 0.471 | 7264 | 0.369 | 9092 | 0.313 | 9620 |
| 0.7 | 0.536 | 7400 | 0.42 | 9370 | 0.354 | 9883 |
| 0.75 | 0.606 | 7514 | 0.475 | 9606 | 0.399 | 10114 |
| 0.8 | 0.681 | 7587 | 0.533 | 9784 | 0.445 | 10356 |
| 0.85 | 0.76 | 7650 | 0.594 | 9932 | 0.495 | 10563 |
| 0.9 | 0.844 | 7693 | 0.653 | 10063 | 0.547 | 10724 |
| 0.95 | 0.934 | 7711 | 0.722 | 10184 | 0.602 | 10880 |
| 1 | 1.03 | 7718 | 0.794 | 10215 | 0.66 | 10979 |
| 1.05 | 1.132 | 7719 | 0.87 | 10099 | 0.72 | 11046 |
| 1.1 | 1.241 | 7686 | 0.95 | 9809 | 0.785 | 11075 |
| 1.15 | 1.358 | 7656 | 1.036 | 9332 | 0.853 | 10982 |
| 1.2 | 1.486 | 7615 | 1.127 | 8665 | 0.925 | 10693 |
| 1.25 | 1.62 | 7548 | 1.225 | 7794 | 1 | 10228 |
| 1.3 | 1.764 | 7377 | 1.331 | 6711 | 1.083 | 9501 |
| 1.35 | 1.921 | 6502 | 1.452 | 5397 | 1.167 | 8524 |
| 1.4 | 2.092 | 5352 | 1.593 | 3900 | 1.263 | 7159 |
| 1.45 | 2.287 | 3955 | 1.763 | 2397 | 1.375 | 5439 |
| 1.5 | 2.516 | 2466 | 1.951 | 1294 | 1.505 | 3511 |
| 1.55 | 2.787 | 1335 | 2.135 | 721 | 1.641 | 1866 |
| 1.6 | 3.069 | 738 | 2.373 | 443 | 1.754 | 943 |
| 1.65 | 3.33 | 451 | 2.469 | 299 | 1.875 | 538 |
| 1.7 | 3.55 | 304 | 2.621 | 216 | 1.924 | 348 |
| 1.75 | 3.764 | 220 | 2.414 | 165 | 2.025 | 245 |
| 1.8 | 3.957 | 167 | 2.591 | 129 | 1.995 | 182 |

FIG. 5

| Simulation Data | | | | | Dyne Test Data | | | |
|---|---|---|---|---|---|---|---|---|
| ZP25K6E-PFV | Copper | | Aluminum | | ZP25K6E-PFV | Copper | Aluminum | |
| Steel | Standard | Standard | Low Loss | High Perm Low Coreloss | Steel | Standard | Standard | High Perm Low Coreloss |
| Stack | 4.375 | 4.75 | 4.75 | 4.75 | Stack | 4.375 | 4.75 | 4.75 |
| BDT | 163.2492 | 171.9524 | 171.7007 | 172.1011 | BDT | 163 | 170.6 | |
| LRT | 7.9302 | 9.8628 | 9.6651 | 9.6686 | PUT @ 300 RPM | 35.6 | 35.6 | 36.4 |
| 50/100 (44.9 oz·ft) | Il | 7.2584 | 7.8339 | 8.3459 | 7.4816 | Il | 7.27 | 7.5 |
| | Im | 6.1333 | 7.3629 | 8.2468 | 6.8884 | Im | 6.3 | 6.98 |
| | Ia | 4.4068 | 4.2293 | 4.2144 | 4.2374 | Ia | 4.41 | 4.25 |
| | Watts | 1606.194 | 1642.0000 | 1650.424 | 1608.5296 | Watts | 1604.7 | 1604.50 |
| | RPM | 3539.204 | 3543.7863 | 3542.226 | 3544.6018 | RPM | 3537.5 | 3544.49 |
| | Eff | 87.7715 | 85.9904 | 85.5138 | 87.7999 | Eff | 87.9 | 88.09 |
| | PF | 96.21 | 91.13 | 85.98 | 93.48 | PF | 96 | 93.03 |
| | Cu-M | 38.087 | 64.7351 | 83.1911 | 55.841 | Cu-M | 40.40 | 57.44 |
| | Cu-A | 36.9734 | 44.6166 | 44.3025 | 44.7864 | Cu-A | 35.22 | 43.26 |
| | Cu-R | 35.9494 | 28.4884 | 33.1181 | 28.4096 | Cu-R | 33.89 | 26.32 |
| | Iron | 70.0787 | 76.8203 | 63.0493 | 53.8201 | Iron | 67.65 | 49.07 |
| | F&W | 15.3293 | 15.3777 | 15.3641 | 15.3847 | F&W | 15 | 15.00 |
| 50/115 (55.5 oz·ft) | Il | 8.7648 | 9.2292 | 9.7007 | 8.9692 | Il | 8.83 | 9.01 |
| | Im | 7.2137 | 8.3678 | 9.1503 | 7.8415 | Im | 7.48 | 8.05 |
| | Ia | 4.3263 | 4.1601 | 4.1457 | 4.1677 | Ia | 4.32 | 4.18 |
| | Watts | 1960.012 | 1998.3526 | 2006.955 | 1963.1355 | Watts | 1963.41 | 1962.82 |
| | RPM | 3522.228 | 3529.1583 | 3527.272 | 3530.1355 | RPM | 3520.75 | 3529.33 |
| | Eff | 88.9034 | 86.976 | 86.5826 | 88.4600 | Eff | 88.39 | 88.63 |
| | PF | 97.01 | 93.63 | 89.92 | 96.27 | PF | 96.7 | 94.69 |
| | Cu-M | 52.6857 | 82.03 | 99.9860 | 73.4245 | Cu-M | 56.98 | 76.40 |
| | Cu-A | 35.6346 | 43.167 | 42.869 | 43.3259 | Cu-A | 33.80 | 41.85 |
| | Cu-R | 52.3126 | 43.7152 | 48.6700 | 41.4898 | Cu-R | 52.38 | 41.41 |
| | Iron | 69.5112 | 76.1116 | 62.4280 | 53.2975 | Iron | 69.82 | 48.51 |
| | F&W | 15.1911 | 15.251 | 15.2347 | 15.2594 | F&W | 15 | 15.00 |
| Resistance | Run | 1.0135 | | | 1.1941 | Run | 1.018 | 1.179 |
| | Start | 1.9089 | | | 2.4943 | Start | 1.611 | 2.399 |
| | | | | | | Qty. Tested | 10 | 17 |

FIG. 6

SINGLE PHASE INDUCTION MOTORS INCLUDING ALUMINUM WINDINGS AND HIGH PERMEABILITY LOW CORELOSS STEEL

FIELD

The present disclosure relates to single phase induction motors including aluminum windings and high permeability low coreloss steel.

BACKGROUND

This section provides background information related to the present disclosure which is not necessarily prior art.

Refrigeration and air conditioning systems generally include a compressor, a condenser, an expansion valve, and an evaporator. A variety of compressor types have been used to implement refrigeration systems, including reciprocating compressors, screw compressors, rotary compressors, etc.

An electric motor drives a scroll members via a drive shaft affixed to the motor rotor. Traditionally, compressors include copper windings in their motors for higher efficiency. Aluminum windings have a higher resistivity than copper. Therefore, replacing the copper windings with aluminum windings may cause a decrease in the efficiency of the motor.

SUMMARY

This section provides a general summary of the disclosure, and is not a comprehensive disclosure of its full scope or all of its features.

According to one aspect of the present disclosure, a single phase induction motor includes a stator core having a stator yoke and a plurality of teeth extending from the stator yoke toward a central opening. The central opening extends from a first end of the stator core to a second end of the stator core opposite the first end. The plurality of teeth are spaced apart from one another and define a plurality of slots between the plurality of teeth for receiving windings of the single phase induction motor. The stator core includes a high permeability low coreloss (HPLC) steel having a relative permeability of greater than or equal to 3000 at 1.5 Tesla and 60 Hertz, and a coreloss of less than or equal to 1.75 watts/lb at 1.5 Tesla and 60 Hertz. The motor also includes multiple windings located within the plurality of slots and wrapped around the plurality of teeth of the stator core. Each of the multiple windings include aluminum wire. The motor further includes a rotor body located concentrically within the stator core. The rotor body includes an external surface that faces the stator core.

According to another aspect of the present disclosure, a single phase induction motor includes a stator core including a stator yoke and a plurality of teeth extending from the stator yoke toward a central opening. The central opening extends from a first end of the stator core to a second end of the stator core opposite the first end, and the plurality of teeth are spaced apart from one another and define a plurality of slots between the plurality of teeth for receiving windings of the single phase induction motor. The stator core includes a high permeability low coreloss (HPLC) steel having a coreloss of less than or equal to 1.6 watts/lb at 1.5 Tesla and 60 Hertz. The motor also includes multiple windings located within the plurality of slots and wrapped around the plurality of teeth of the stator core, where each of the multiple windings include aluminum wire. The motor further includes a rotor body located concentrically within the stator core. The rotor body includes an external surface that faces the stator core.

According to another aspect of the present disclosure, a single phase induction motor includes a stator core including a stator yoke and a plurality of teeth extending from the stator yoke toward a central opening. The central opening extends from a first end of the stator core to a second end of the stator core opposite the first end, and the plurality of teeth are spaced apart from one another and define a plurality of slots between the plurality of teeth for receiving windings of the single phase induction motor. The stator core includes a high permeability low coreloss (HPLC) steel having a relative permeability of greater than or equal to 3500 at 1.5 Tesla and 60 Hz. The motor also includes multiple windings located within the plurality of slots and wrapped around the plurality of teeth of the stator core, where each of the multiple windings include aluminum wire. The motor further includes a rotor body located concentrically within the stator core. The rotor body includes an external surface that faces the stator core.

According to another aspect of the present disclosure, a compressor apparatus includes a scroll compression unit, and a single phase induction motor coupled to drive the scroll compression unit. The single phase induction motor includes a stator core including a stator yoke and a plurality of teeth extending from the stator yoke toward a central opening. The central opening extends from a first end of the stator core to a second end of the stator core opposite the first end, and the plurality of teeth are spaced apart from one another and define a plurality of slots between the plurality of teeth for receiving windings of the single phase induction motor. The motor includes multiple windings located within the plurality of slots and wrapped around the plurality of teeth of the stator core, and each of the multiple windings include aluminum wire. The motor also includes a rotor body located concentrically within the stator core, and the rotor body includes an external surface that faces the stator core. The rotor body and the stator core include a high permeability low coreloss (HPLC) steel having a relative permeability of greater than or equal to 3000 at 1.5 Tesla and 60 Hertz, and a coreloss of less than or equal to 1.75 watts/lb at 1.5 Tesla and 60 Hertz. An outer diameter of the stator core is less than or equal to 5.3 inches and a stack height of the stator core is less than or equal to 4.75 inches Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 illustrates example permeability and coreloss values at specified increments of flux density.

FIG. 6 illustrates example simulation and dyne test data for the motor of FIG. 1.

Corresponding reference numerals indicate corresponding parts throughout the several views of the drawings.

DETAILED DESCRIPTION

Figure 1:
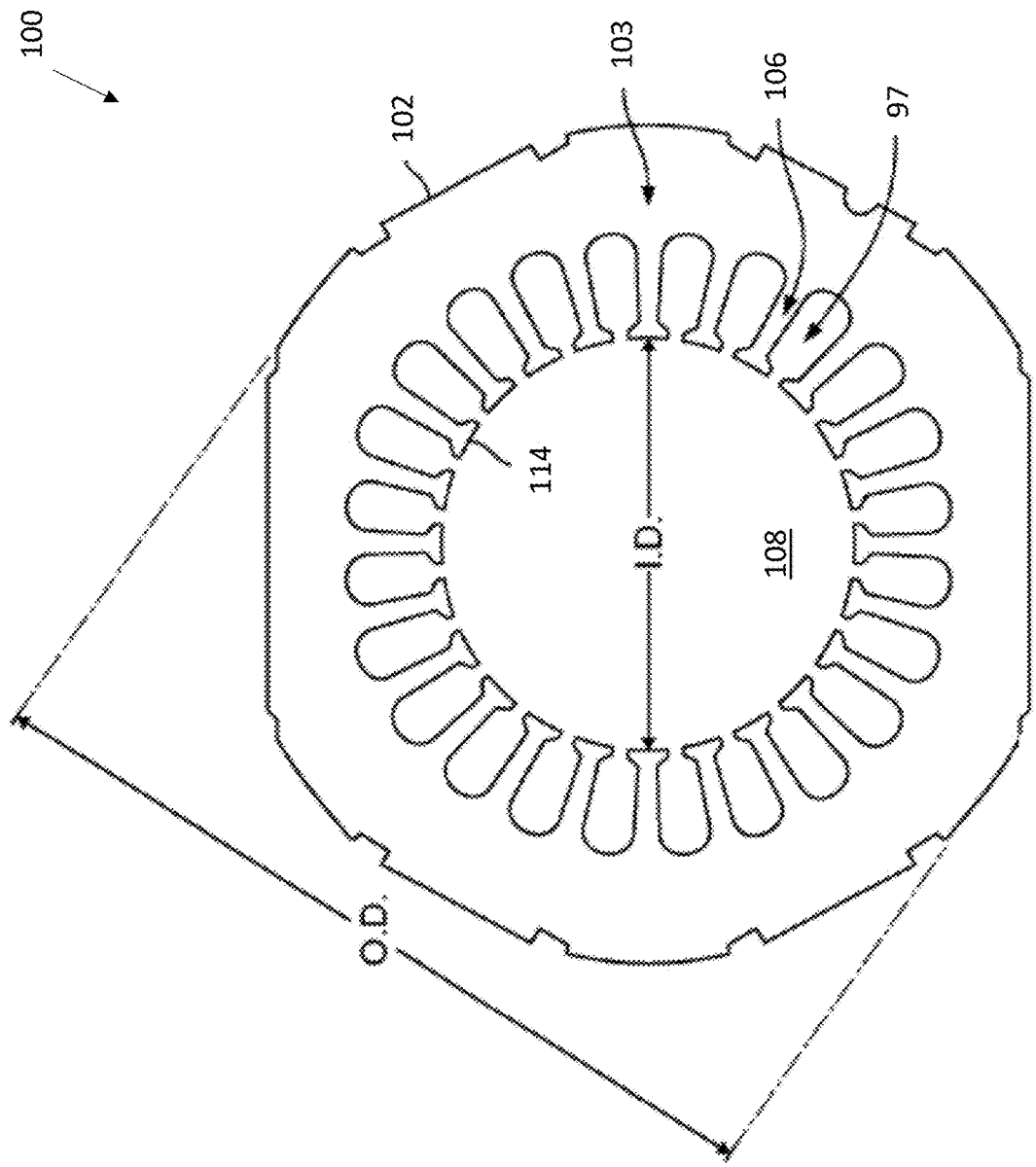
FIG. 1 is a top view of a single phase induction motor including a stator core with high permeability low coreloss steel, according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
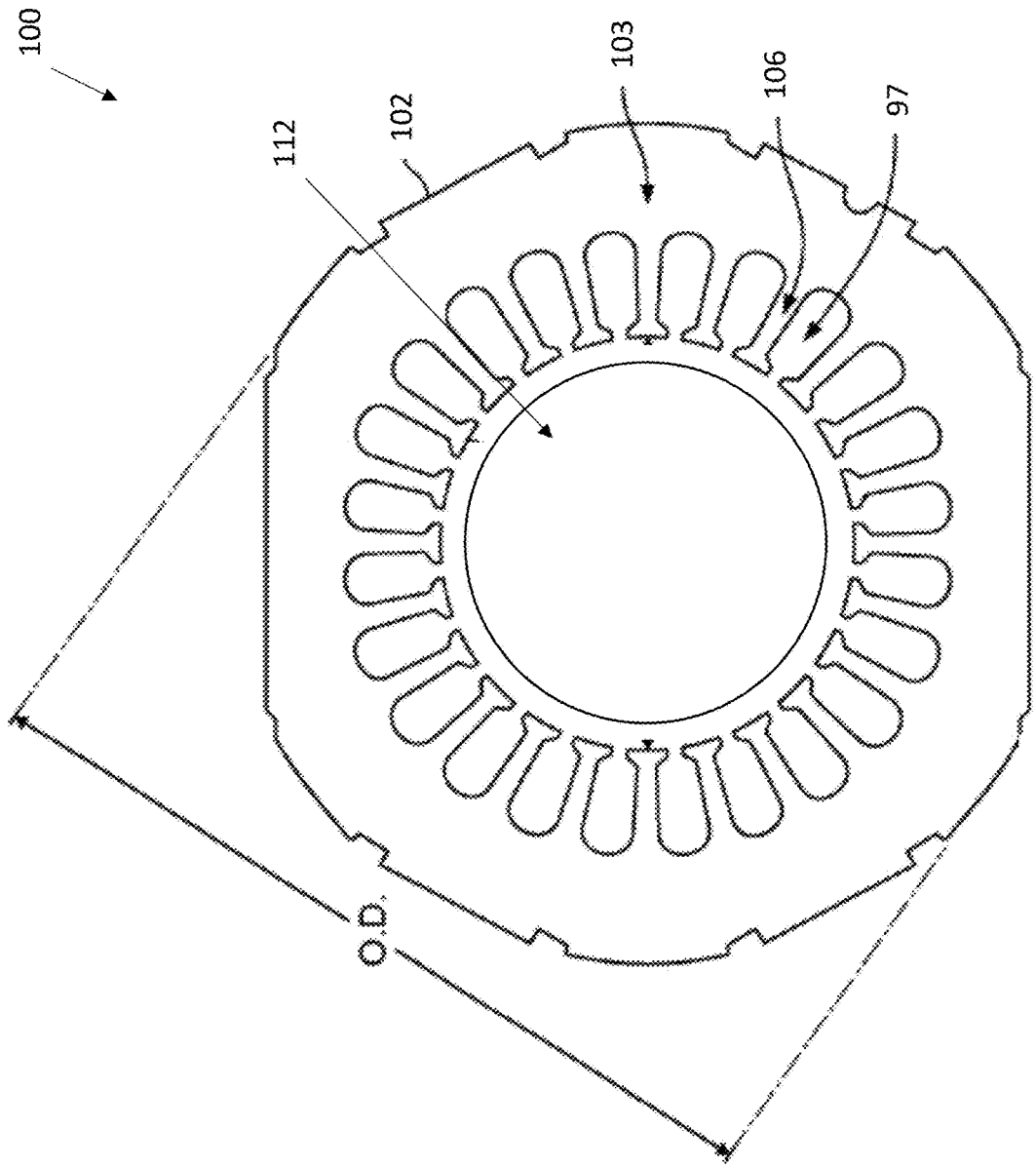
FIG. 2 is a top view of the motor of FIG. 1 including a rotor body.
Figure 3:
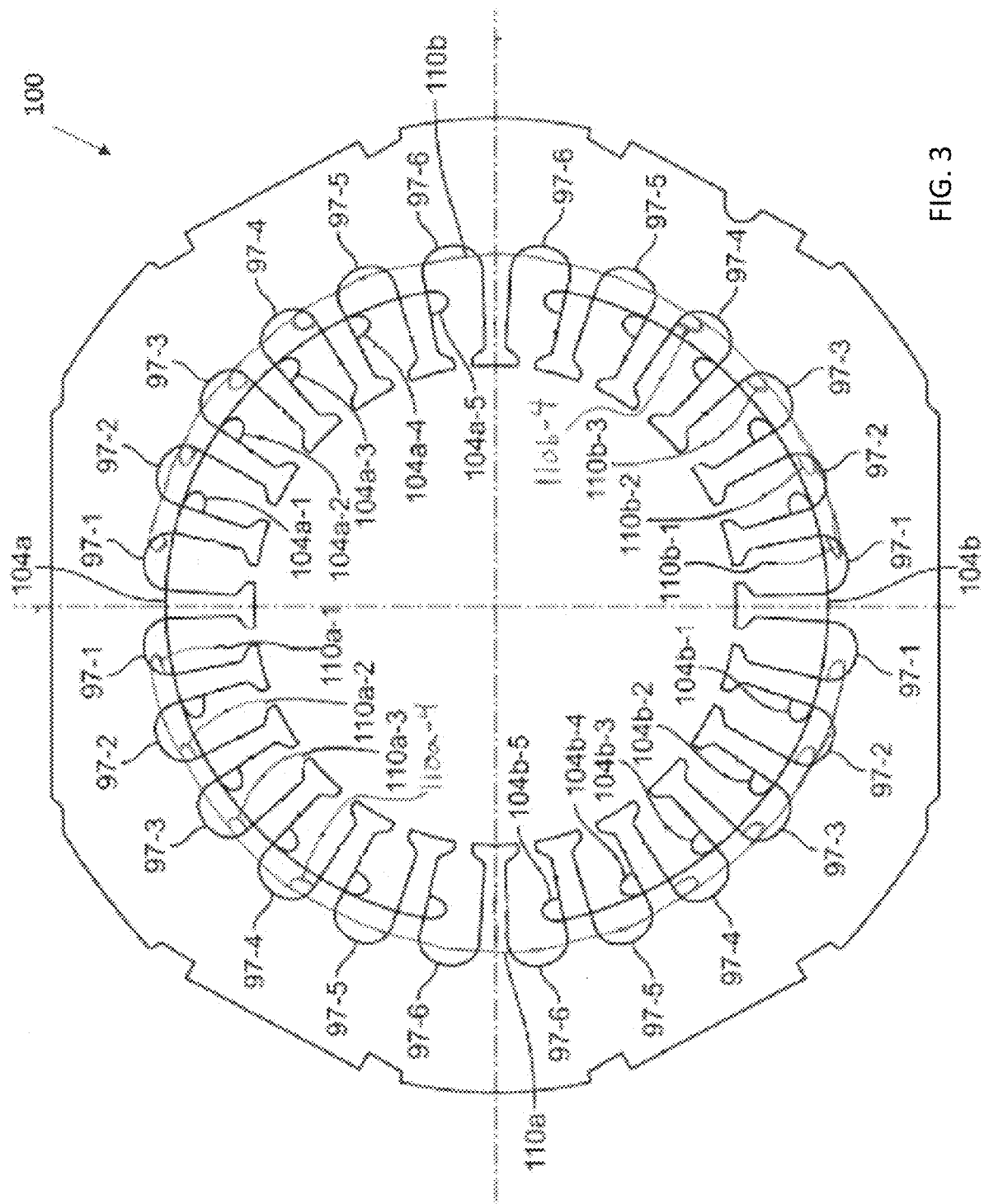
FIG. 3 is a top view of the motor of FIG. 1 illustrating an example winding pattern of the motor.

A single phase induction motor according to one example embodiment of the present disclosure is illustrated in FIGS. 1-3, and indicated generally by the reference number 100. The motor 100 includes a stator core 102 having a stator yoke 103 and a plurality of teeth 106 extending from the stator yoke 103 toward a central opening 108. The central opening 108 extends from a first end of the stator core to a second end of the stator core opposite the first end. The plurality of teeth 106 are spaced apart from one another and define a plurality of slots 97 between the plurality of teeth 106 for receiving windings of the single phase induction motor 100.

The stator core 102 (and optionally the rotor body 112) include a high permeability low coreloss (HPLC) steel. For example, and as described further herein, the stator core 102 and the rotor body 112 may include higher permeability characteristics and lower coreless characteristics as compared to standard steel stator cores, such as the core 102 and the rotor body 112 optionally having a relative permeability of greater than or equal to 3000 at 1.5 Tesla, optionally having a coreloss of less than or equal to 1.75 watts/lb at 1.5 Tesla, etc.

The motor 100 also includes multiple windings located within the plurality of slots 97 and wrapped around the plurality of teeth 106 of the stator core 102. Each of the multiple windings include aluminum wire. As shown in FIG. 2, the motor 100 includes a rotor body 112 located concentrically within the opening 108 of the stator core 102. The rotor body 112 includes an external surface that faces the stator core 102.

As shown in FIGS. 1 and 2, the plurality of teeth 106 extend radially inward from the stator yoke 103. The plurality of teeth 106 define the boundaries of the winding slots 97 that are each located between adjacent teeth 106. Collectively, interior ends 114 of the plurality of teeth 106 define the central opening 108 that receives the rotor body 112. Each slot 97 has a proximate end nearest the central opening 108, and a distal end radially distant from the central opening 108. Although the teeth 106 and the winding slots 97 are illustrated as being equally spaced circumferentially about the stator core 102, in other embodiments various other known teeth and slot configurations may be used.

The central opening 108 defines an interior diameter generally referred to as I.D., and the outside edge of the yoke 103 defines an outer perimeter having an outer diameter generally referred to as O.D. The outer diameter O.D. may have any suitable value, such as less than or equal to about 4.8 inches, less than or equal to about 5.3 inches, less than or equal to about 5.5 inches, less than or equal to about 6.3 inches, etc. Other embodiments may have smaller or larger O.D. measurements.

The stator core 102 may include one or more stacked laminations, and may have a specified stack height. For example, the stack height may be less than or equal to about 4.0 inches, less than or equal to about 4.375 inches, less than or equal to about 4.75 inches, less than or equal to about 5.75 inches, the core may have a smaller or larger stack height, etc.

The volume of the motor 100 may be less than or equal to about 133.43 cubic inches (e.g., as measured multiplying a length of the motor with the motor diameter squared ($D^2*L$)), may have a smaller or larger volume, etc. In some embodiments, the motor 100 may have a frame size of about 48, about 53, about 55, about 63, smaller or larger frame sizes, etc.

As used herein, the terms about and substantially may mean manufacturing tolerances, within plus or minus one percent, within plus or minus five percent, etc. Example dimensions and values used herein are for purposes of illustration only, and other embodiments may have smaller or larger dimensions or values.

FIG. 3 illustrates an example winding pattern for a main winding including opposing sections 104a and 104b, and a start winding including opposing sections 110a and 110b. The windings may be formed by looping conducting wire including aluminum about the teeth 106. For example, the conducing wire may include only aluminum without any copper, may include a hybrid of aluminum and copper, etc. In some embodiments, the conducting wire may include aluminum alloy(s) suitable for used in forming motor windings.

The main winding sections 104a and 104b form the two main poles of the motor 100. In the main winding section 104a, a main winding coil 104a-1 is located within a slot pair 97-2, where each slot in the slot pair 97-2 opposes one another. The main winding coils 104a-2, 104a-3, 104a-4, and 104a-5 are located, respectively, in the slot pairs 97-3, 97-4, 97-5, and 97-6.

In the embodiment illustrated in FIG. 3, each of the main winding coils 104a-1, 104a-2, 104a-3, 104a-4, and 104a-5 are located at the distal end of their respective slots away from central opening relative to the start winding. Alternatively, in some arrangements each of the main winding coils 104a-1, 104a-2, 104a-3, 104a-4, and 104a-5 may be located in the slots proximate the central opening 108 relative to the start winding. The main winding sections 104b-1 through 104b-5 are similarly positioned within the slots 97-2 through 97-5 on the opposite side of the stator core 102.

The start winding sections 110a and 110b collectively form two starting poles for the motor 100. In the start winding 110a, a start winding coil 110a-1 is positioned within a slot pair 97-1, where each slot in the slot pair 97-1 opposes one another. The start winding coils 110a-2, 110a-3 and 110a-4 are located, respectively, in the slot pairs 97-2, 97-3 and 97-4. The start windings 110b-1 through 110b-4 of the other start winding portion 110b are similarly located in the slots 97-1 through 97-4 on the opposite side of the stator core 102.

As mentioned above, the stator core 102 (and optionally the rotor body 112) include a high permeability low coreloss (HPLC) steel. For example, the steel of the stator core 102 and the rotor body 112 may include higher permeability characteristics and lower coreless characteristics as compared to standard steel stator cores, as illustrated in the example waveforms of FIG. 4.

Permeability is a measure of the resistance of a material against the formation of a magnetic field, otherwise known as distributed inductance in transmission line theory. It is the degree of magnetization that a material obtains in response to an applied magnetic field.

Saturation induction occurs in some magnetic materials. Saturation is a state where an increase in an applied external magnetic field H does not increase the magnetization of the material further, so the total magnetic flux density B approximately levels off (e.g., it may continue to increase very slowly with the field due to the vacuum permeability). Saturation is a characteristic of ferromagnetic and ferrimagnetic materials, such as iron, nickel, cobalt, and their alloys. Different ferromagnetic materials have different saturation levels. Permeability and saturation induction use different measurement methods, where saturation induction is measured in Tesla and permeability is unitless. In general, a higher permeability/saturation induction is better.

Figure 4:
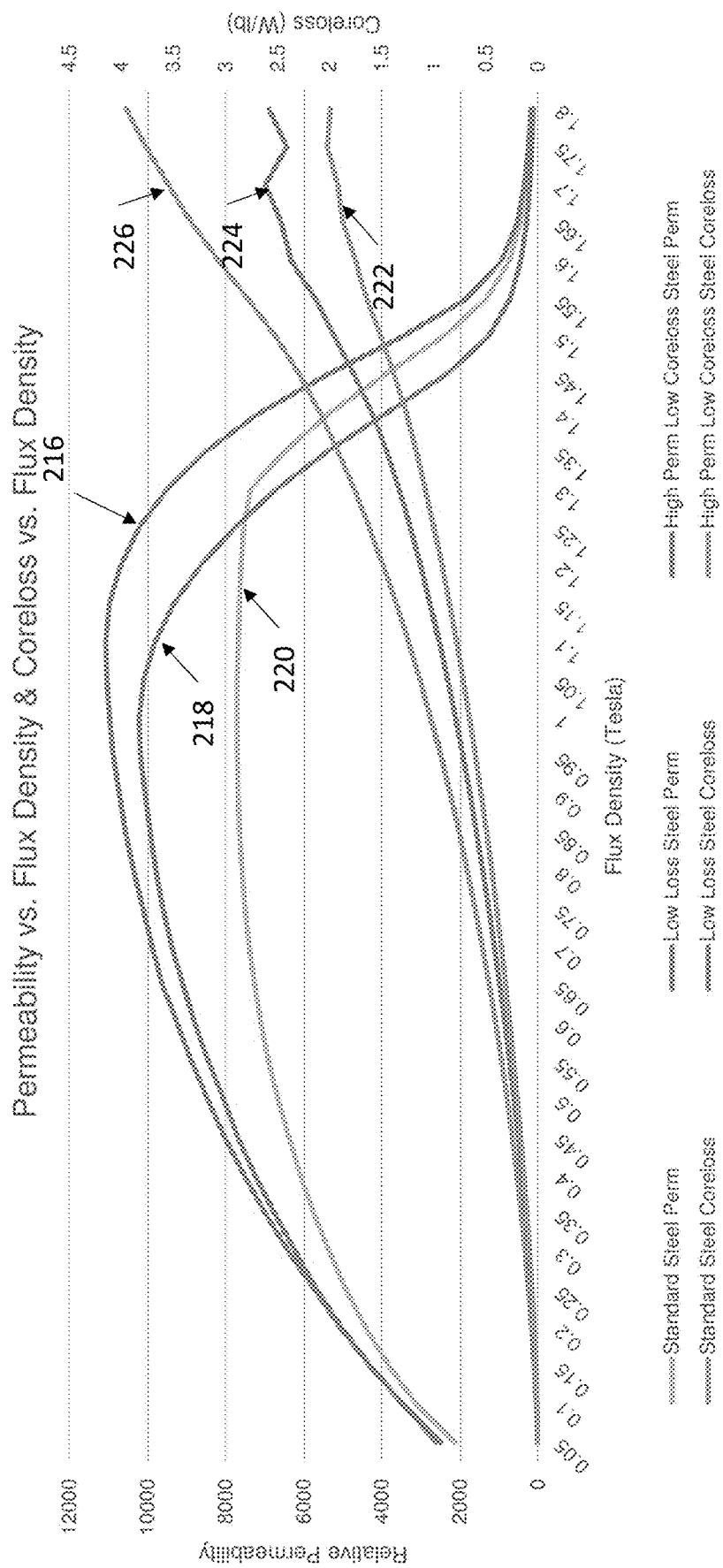
FIG. 4 is a graph of example permeability and coreloss waveforms of the stator of the motor of FIG. 1.

As shown in FIG. 4, an example relative permeability 216 of the HPLC steel is higher over a range of flux density values as compared to a relative permeability 218 of a low loss steel and a relative permeability 220 of a standard steel. For example, the relative permeability 216 of the HPLC steel may be greater than or equal to about 3000 at 1.5 Tesla and 60 Hertz, greater than or equal to about 3500 at 1.5 Tesla and 60 Hertz, greater than or equal to about 9000 at 1.25 Tesla and 60 Hertz, etc. As shown in FIG. 4, the HPLC has significantly higher permeability than the low loss steel and the standard steel, particularly above a flux density of 1.0 Tesla.

Example values for the permeability of the HPLC at 0.05 Tesla increments of flux density values are illustrated in FIG. 5. In other embodiments, the relative permeability of the HPLC steel may be higher or lower across the range of flux density values. The motor 100 may have a peak flux density of greater than or equal to about 1.5 Tesla, higher or lower peak flux densities, etc.

Coreloss may relate to the total energy lost through generation of heat. The coreloss includes loss that occurs in a magnetic core due to alternating magnetization, which is the sum of hysteresis loss and eddy current loss. Generally, lower coreloss is better.

An example coreloss 222 of the HPLC steel is lower over the range of flux density values as compared to a coreloss 224 of the low loss steel and a coreloss 226 of the standard steel. For example, the coreloss 222 of the HPLC steel may be less than or equal to about 1.75 watts/lb at 1.5 Tesla and 60 Hertz, less than or equal to about 1.25 watts/lb at 1.25 Tesla and 60 Hertz, less than or equal to about 1.75 watts/lb at 1.5 Tesla and 60 Hertz, etc. As shown in FIG. 4, the HPLC has significantly lower coreloss than the low loss steel and the standard steel.

Example values for the permeability of the HPLC at 0.05 Tesla increments of flux density values are illustrated in FIG. 5. In other embodiments, the coreloss of the HPLC steel may be higher or lower across the range of flux density values.

The HPLC steel may be an electrical steel that includes an iron alloy tailored to produce specific magnetic properties including a small hysteresis area resulting in low power loss per cycle, low core loss, and high permeability. For example, the alloy may have from zero to 6.5% silicon (e.g., less than or equal to 3.2% silicon), up to 0.5% manganese, up to 0.5% aluminum, less than 0.005% carbon, etc.

Example physical properties of HPLC steel with about 3% silicon may include a melting point of about 1500° C., a density of about 7,650 kg/m$^3$, a resistivity of about $4.72 \times 10^{-7}$ Ω·m, etc. The steel may be isotropic, non-oriented, grain-oriented, etc. The HPLC steel may have any suitable thickness, including a range between 0.0141 inches and 0.030 inches, a value of about 0.0197 inches, etc.

Using high permeability (e.g., high saturation induction) and low coreloss steel may allow for converting copper windings of a single phase motor to aluminum windings (e.g., only aluminum, a hybrid of aluminum and copper, etc.), while maintaining similar efficiency, performance, size, etc., of the motor. For example, using high permeability and low coreloss steel may allow for converting copper windings to aluminum windings while maintaining an identical efficiency. Further, using high permeability and low coreloss steel may improve motor efficiency for a same size, or allow for a reduced size motor with the same efficiency. In various implementations, efficiency and size requirements may be tradeoffs where high permeability and low coreloss steel can be used accordingly based on the requirements of the motor design.

For example, when copper windings are converted to aluminum, resistance in the windings increases significantly. When transitioning to a high slot-fill aluminum winding, maximum torque produced by the motor also reduces. In order to match the breakdown torque, aluminum winding turns/wire size may be adjusted which also increases the current drawn by the motor. The increased current and resistance increases winding losses significantly.

A high-slot fill winding, which refers to the amount of magnet wire entered for a given slot area, helps to reduce the winding losses because of using more wire for a given area. In some embodiments, the motor 100 may have a minimum slot fill of about 75% for unshared winding slots (e.g., an unshared slot fill of 81% in a preferred embodiment), a minimum slot fill of about 70% for shared winding slots (e.g., a shared slot fill of 74% in a preferred embodiment), higher or lower slot fills, etc.

A high saturation induction or high permeability of steel reduces the magnetizing current of the motor, which further reduces the main winding current of the motor and helps to reduce the winding losses. Low coreloss steel helps to reduce the iron loss of motor. Reducing both winding losses and iron losses of the motor helps to maintain efficiency of an aluminum winding motor compared to a baseline copper winding motor.

FIG. 6 illustrates example simulation and dyne test data comparing results from a baseline motor using copper windings to a motor that uses aluminum windings with three types of steel: standard, low loss and high permeability/low coreloss (HPLC). As shown in FIG. 6, the motor with aluminum windings and HPLC steel approximates the performance of the copper baseline motor better than the standard steel or low loss steel motors.

If standard steel is used to convert copper winding motors to aluminum winding, it may not be possible to achieve the same efficiency as a copper-winding motor with reduced component costs, because the winding copper losses and the iron losses increase significantly. If low loss steel is used instead of standard steel to convert copper winding motors to aluminum windings, it may not be possible to achieve the same efficiency as the copper-winding motor with reduced component costs, because the winding copper losses increase significantly as a result of lower permeability.

In contrast, if high permeability and low coreloss steel is used, it may facilitate achieving the same efficiency as copper-winding motors because the higher permeability reduces current drawn by the motor, and the lower coreloss reduces iron losses as compared to standard steel or low loss steel. Lower current reduces the winding copper losses, and lower winding copper losses and lower iron losses help to reduce overall losses, which may allow an aluminum winding motor to match the efficiency of a copper motor with reduced component costs.

Figure 7:
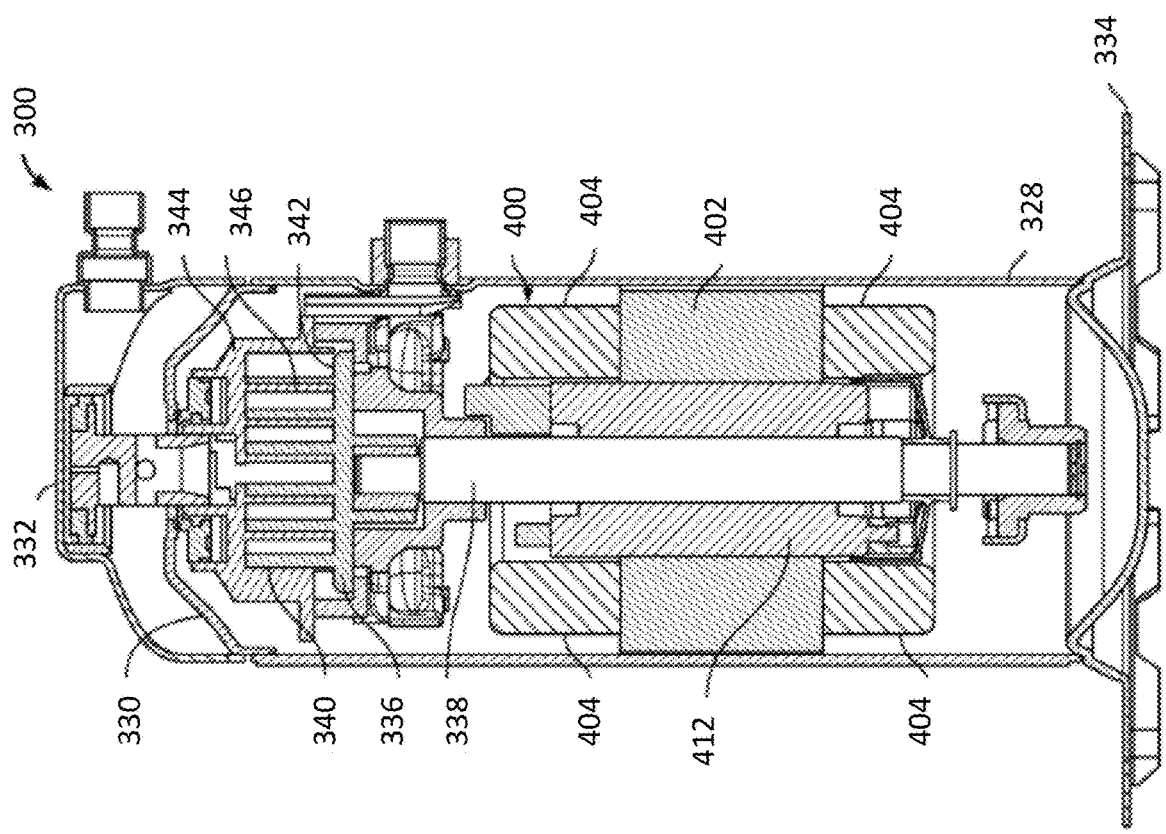
FIG. 7 is a cross sectional view of a scroll compressor according to another example embodiment of the present disclosure.

FIG. 7 illustrates a compressor 300, according to another example embodiment. As shown in FIG. 7, the compressor 300 includes a cylindrical shell 328, a partition 330 connected to an upper end of the shell, a lid 332 connected to the partition 330 and a base 334 connected to a lower end of the shell 328. A single phase motor 400 is configured to drive an orbital scroll member 336. The motor 400 includes a stator assembly 402, windings 404 wound about the stator assembly 402, and a rotor 412 coupled to a drive shaft 338. For example, the motor 400 may be similar to the motor 100 illustrated in FIGS. 1-3.

The motor 400 communicates mechanical energy to the orbiting scroll member 336 via the drive shaft 338. The orbital scroll member 336 has a spiral vane 340 extending upward from an end plate 342. A non-orbiting scroll member 344 includes a vane 346 extending downward in meshing engagement with the orbital scroll member 336. The interaction between the scroll members 336 and 344 may broadly be defined as a pump.

The compressor 300 is illustrated as a scroll compressor (e.g., a hermetically sealed compressor). In other embodiments, other types of compressor apparatuses may be used where a single phase induction is coupled to drive a compression unit. A pump apparatus may include a pump and a single phase induction motor coupled to drive the pump.

In some embodiments, example motors, compressors, etc. described herein may be rated to provide up to about 2.0 Ton air-conditioning and heat pump applications, up to about 2.5 Ton applications, up to about 3.0 Ton applications, higher or lower tonnage applications, etc.

According to another example embodiment, a single phase induction motor includes a stator core including a stator yoke and a plurality of teeth extending from the stator yoke toward a central opening. The central opening extends from a first end of the stator core to a second end of the stator core opposite the first end, and the plurality of teeth are spaced apart from one another and define a plurality of slots between the plurality of teeth for receiving windings of the single phase induction motor.

The stator core includes a high permeability low coreloss (HPLC) steel having a coreloss of less than or equal to 1.75 watts/lb at 1.5 Tesla and 60 Hertz. The motor also includes multiple windings located within the plurality of slots and wrapped around the plurality of teeth of the stator core, where each of the multiple windings include aluminum wire. The motor further includes a rotor body located concentrically within the stator core. The rotor body includes an external surface that faces the stator core.

In some embodiments, a coreloss of the steel of the stator core may be less than or equal to 1.25 watts/lb at 1.25 Tesla and 60 Hertz, may be less than or equal to 1.6 watts/lb at 1.5 Tesla and 60 Hertz, etc. The multiple windings may include a hybrid of aluminum and copper, only aluminum, etc.

According to another example embodiment, a compressor apparatus includes a scroll compression unit, and a single phase induction motor coupled to drive the scroll compression unit. The single phase induction motor includes a stator core having a stator yoke and a plurality of teeth extending from the stator yoke toward a central opening. The central opening extends from a first end of the stator core to a second end of the stator core opposite the first end, and the plurality of teeth are spaced apart from one another and define a plurality of slots between the plurality of teeth for receiving windings of the single phase induction motor.

The stator core includes a high permeability low coreloss (HPLC) steel. The motor also includes multiple windings located within the plurality of slots and wrapped around the plurality of teeth of the stator core, with each of the multiple windings including aluminum wire, and a rotor body located concentrically within the stator core. The rotor body includes an external surface that faces the stator core. In some embodiments, the multiple windings may include a hybrid of aluminum and copper, only aluminum, etc.

Example embodiments described herein may provide one or more advantages, including but not limited to reducing a component cost of the motor by converting the windings from copper to aluminum while using high permeability and low coreloss steel to maintain efficiency and performance of the motor in a similar size and form. For example, changing to aluminum windings may significantly reduce the weight compared to using copper windings, including a weight reduction in a range of between fifty to eighty percent (e.g., 64% in a preferred embodiment). Changing to aluminum windings may significantly reduce the material costs of the motor, including a cost savings in a range of between three dollars to seven dollars per motor. Material cost savings may vary based on commodity prices for steel, copper wire, aluminum wire, raw aluminum, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A single phase induction motor comprising:
a stator core including a stator yoke and a plurality of teeth extending from the stator yoke toward a central opening, the central opening extending from a first end of the stator core to a second end of the stator core opposite the first end, the plurality of teeth spaced apart from one another and defining a plurality of slots between the plurality of teeth for receiving windings of the single phase induction motor, the stator core comprising a high permeability low coreloss (HPLC) steel having a relative permeability of greater than or equal to 3000 at 1.5 Tesla and 60 Hertz, and a coreloss of less than or equal to 1.75 watts/lb at 1.5 Tesla and 60 Hertz;
multiple windings located within the plurality of slots and wrapped around the plurality of teeth of the stator core, each of the multiple windings comprising aluminum wire; and
a rotor body located concentrically within the stator core, the rotor body including an external surface that faces the stator core.

2. The motor of claim 1, wherein the multiple windings comprise a hybrid of aluminum and copper.

3. The motor of claim 1, wherein the multiple windings comprise only aluminum.

4. The motor of claim 1, wherein a peak flux density of the motor is greater than or equal to 1.5 Tesla.

5. The motor of claim 1, wherein a volume of the motor is less than or equal to 133.43 cubic inches, as measured by multiplying a length of the motor with the motor diameter squared.

6. The motor of claim 1, wherein an outer diameter of the stator core is less than or equal to 5.3 inches.

7. The motor of claim 1, wherein a stack height of the stator core is less than or equal to 4.75 inches.

8. The motor of claim 1, wherein the relative permeability of the steel of the stator core is greater than or equal to 9000 at 1.25 Tesla and 60 Hertz.

9. The motor of claim 1, wherein the relative permeability of the steel of the stator core is greater than or equal to 3500 at 1.5 Tesla and 60 Hz.

10. The motor of claim 1, wherein a coreloss of the steel of the stator core is less than or equal to 1.25 watts/lb at 1.25 Tesla and 60 Hertz.

11. The motor of claim 1, wherein the coreloss of the steel of the stator core is less than or equal to 1.6 watts/lb at 1.5 Tesla and 60 Hertz.

12. The motor of claim 1, wherein a thickness of the steel is between 0.0141 inches and 0.030 inches.

13. The motor of claim 1, wherein the rotor body comprises the high permeability low coreloss (HPLC) steel having a relative permeability of greater than or equal to 3000 at 1.5 Tesla and 60 Hertz, and a coreloss of less than or equal to 1.75 watts/lb at 1.5 Tesla and 60 Hertz.

14. A compressor apparatus comprising:
a compression unit; and
the motor of claim 1 coupled to drive the compression unit.

15. The compressor apparatus of claim 14, wherein the compression unit comprises a scroll compressor.

16. A pump apparatus comprising:
a pump; and
the motor of claim 1 coupled to drive the pump.

17. A single phase induction motor comprising:
a stator core including a stator yoke and a plurality of teeth extending from the stator yoke toward a central opening, the central opening extending from a first end of the stator core to a second end of the stator core opposite the first end, the plurality of teeth spaced apart from one another and defining a plurality of slots between the plurality of teeth for receiving windings of the single phase induction motor, the stator core comprising a high permeability low coreloss (HPLC) steel having a coreloss of less than or equal to 1.6 watts/lb at 1.5 Tesla;
multiple windings located within the plurality of slots and wrapped around the plurality of teeth of the stator core, each of the multiple windings comprising aluminum wire; and
a rotor body located concentrically within the stator core, the rotor body including an external surface that faces the stator core.

18. The motor of claim 17, wherein a coreloss of the steel of the stator core is less than or equal to 1.25 watts/lb at 1.25 Tesla.

19. The motor of claim 17, wherein the rotor body comprises the high permeability low coreloss (HPLC) steel having a coreloss of less than or equal to 1.6 watts/lb at 1.5 Tesla and 60 Hertz.

20. A single phase induction motor comprising:
a stator core including a stator yoke and a plurality of teeth extending from the stator yoke toward a central opening, the central opening extending from a first end of the stator core to a second end of the stator core opposite the first end, the plurality of teeth spaced apart from one another and defining a plurality of slots between the plurality of teeth for receiving windings of the single phase induction motor, the stator core comprising a high permeability low coreloss (HPLC) steel having a relative permeability of greater than or equal to 3500 at 1.5 Tesla and 60 Hz;
multiple windings located within the plurality of slots and wrapped around the plurality of teeth of the stator core, each of the multiple windings comprising aluminum wire; and
a rotor body located concentrically within the stator core, the rotor body including an external surface that faces the stator core.

21. The motor of claim 20, wherein the relative permeability of the steel of the stator core is greater than or equal to 9000 at 1.25 Tesla and 60 Hertz.

22. The motor of claim 20, wherein the rotor body comprises the high permeability low coreloss (HPLC) steel having a relative permeability of greater than or equal to 3500 at 1.5 Tesla and 60 Hertz.

23. A compressor apparatus comprising:
   a scroll compression unit; and
   a single phase induction motor coupled to drive the scroll compression unit, the single phase induction motor comprising:
   a stator core including a stator yoke and a plurality of teeth extending from the stator yoke toward a central opening, the central opening extending from a first end of the stator core to a second end of the stator core opposite the first end, the plurality of teeth spaced apart from one another and defining a plurality of slots between the plurality of teeth for receiving windings of the single phase induction motor;
   multiple windings located within the plurality of slots and wrapped around the plurality of teeth of the stator core, each of the multiple windings comprising aluminum wire; and
   a rotor body located concentrically within the stator core, the rotor body including an external surface that faces the stator core, the rotor body and the stator core comprising a high permeability low coreloss (HPLC) steel having a relative permeability of greater than or equal to 3000 at 1.5 Tesla and 60 Hertz, and a coreloss of less than or equal to 1.75 watts/lb at 1.5 Tesla and 60 Hertz, wherein an outer diameter of the stator core is less than or equal to 5.3 inches and a stack height of the stator core is less than or equal to 4.75 inches.

\* \* \* \* \*